US010056657B2

(12) United States Patent
Goesmann et al.

(10) Patent No.: US 10,056,657 B2
(45) Date of Patent: Aug. 21, 2018

(54) ENERGY STORAGE MODULE COMPRISING A PLURALITY OF PRISMATIC STORAGE CELLS

(71) Applicant: Bayerische Motoren Werke Aktiengesellschaft, Munich (DE)

(72) Inventors: Hubertus Goesmann, Nattheim-Auernheim (DE); Bjoern Lath, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 531 days.

(21) Appl. No.: 14/052,234

(22) Filed: Oct. 11, 2013

(65) Prior Publication Data

US 2014/0038021 A1    Feb. 6, 2014

Related U.S. Application Data

(63) Continuation of application No. PCT/EP2012/001778, filed on Apr. 26, 2012.

(30) Foreign Application Priority Data

May 27, 2011 (DE) .................. 10 2011 076 580

(51) Int. Cl.
*H01M 10/625* (2014.01)
*H01M 10/647* (2014.01)
(Continued)

(52) U.S. Cl.
CPC ....... *H01M 10/625* (2015.04); *H01M 10/647* (2015.04); *H01M 10/6554* (2015.04); *H01M 2/1077* (2013.01); *H01M 10/0413* (2013.01)

(58) Field of Classification Search
CPC ... H01M 2/0245; H01M 2/1077; H01M 10/50
See application file for complete search history.

(56) References Cited

U.S. PATENT DOCUMENTS 4,100,333 A    7/1978  Haas et al.
5,756,227 A *  5/1998  Suzuki .................. F28F 3/02
                                                      429/120
(Continued)

FOREIGN PATENT DOCUMENTS

CN    2450785 Y    9/2001
CN    201011658 Y  1/2008
(Continued)

OTHER PUBLICATIONS

International Search Report dated Feb. 18, 2013, with Statement of Relevancy (Nine (9) pages).

(Continued)

*Primary Examiner* — Sarah A. Slifka
*Assistant Examiner* — Victoria Hom Lynch
(74) *Attorney, Agent, or Firm* — Crowell & Moring LLP

(57) ABSTRACT

The present invention relates to an energy storage module for an apparatus for supplying voltage, in particular of a motor vehicle, in which the energy storage module has a plurality of prismatic storage cells which, in a manner stacked to form at least one row, are arranged one behind the other and are braced between two end plates by means of at least one tie rod. The tie rod may be in the form of a thermally conductive metal sheet for dissipating the heat from the storage cells to a cooling device.

13 Claims, 3 Drawing Sheets

(51) Int. Cl.
*H01M 10/6554* (2014.01)
*H01M 2/10* (2006.01)
*H01M 10/04* (2006.01)

(56) References Cited

U.S. PATENT DOCUMENTS

| | | |
|---|---|---|
| 5,817,434 A | 10/1998 | Brooker et al. |
| 6,821,671 B2 | 11/2004 | Hinton et al. |
| 7,572,549 B2 | 8/2009 | Wegner |
| 8,426,079 B2 | 4/2013 | Okada |
| 2005/0058891 A1 | 3/2005 | Marraffa |
| 2007/0007141 A1 | 1/2007 | Maeda et al. |
| 2008/0280194 A1 | 11/2008 | Okada |
| 2009/0214900 A1 | 8/2009 | Hoffjann et al. |
| 2010/0136405 A1 | 6/2010 | Johnson et al. |
| 2010/0190049 A1 | 7/2010 | Kawase et al. |
| 2011/0052961 A1* | 3/2011 | Lamm et al. .......... 429/120 |
| 2011/0212355 A1* | 9/2011 | Essinger ........ H01M 2/1016 429/120 |
| 2012/0094165 A1* | 4/2012 | Valencia et al. .......... 429/120 |
| 2012/0282506 A1 | 11/2012 | Hohenthanner et al. |
| 2012/0288741 A1 | 11/2012 | Gutsch et al. |
| 2012/0301775 A1 | 11/2012 | Lachenmeier et al. |

FOREIGN PATENT DOCUMENTS

| | | |
|---|---|---|
| CN | 101946343 A | 1/2011 |
| DE | 43 34 282 A1 | 4/1995 |
| DE | 196 33 095 A1 | 2/1997 |
| DE | 101 23 579 A1 | 11/2002 |
| DE | 10 2005 031 504 A1 | 1/2007 |
| DE | 10 2006 029 511 A1 | 1/2007 |
| DE | 10 2005 051 583 A1 | 5/2007 |
| DE | 10 2006 048 291 A1 | 2/2008 |
| DE | 10 2008 059 964 A1 | 6/2010 |
| DE | 10 2008 059 966 A1 | 6/2010 |
| DE | 10 2009 057 565 A1 | 7/2010 |
| DE | 10 2009 035 482 A1 | 2/2011 |
| DE | 10 2009 028 920 A1 | 3/2011 |
| DE | 10 2009 040 147 A1 | 3/2011 |
| DE | 10 2009 048 250 A1 | 4/2011 |
| EP | 0 264 073 B1 | 4/1988 |
| EP | 2 390 941 B1 | 4/2013 |
| GB | 1 526 279 A | 9/1978 |
| GB | 2 283 089 A | 4/1995 |
| JP | 2002-042763 A | 2/2002 |
| JP | 2004-235110 A | 8/2004 |
| JP | 2004-349202 A | 12/2004 |
| JP | 2007-294407 A | 11/2007 |
| JP | 2008-124033 A | 5/2008 |
| JP | 2009-048965 A | 3/2009 |
| JP | 2009-182001 A | 8/2009 |
| JP | 2011-253799 A | 12/2011 |
| KR | 10-2006-0085775 A | 7/2006 |
| WO | WO 2006/024421 A2 | 3/2006 |
| WO | WO 2007/117212 A2 | 10/2007 |
| WO | WO 2009/103526 A1 | 8/2009 |
| WO | WO 2011/054544 A1 | 5/2011 |
| WO | WO 2011/134697 A1 | 11/2011 |

OTHER PUBLICATIONS

German Search Report dated Feb. 10, 2012, with Statement of Relevancy (Five (5) pages).
International Search Report dated Jul. 23, 2012, with Statement of Relevancy (Five (5) pages).
German Search Report dated Jan. 17, 2012, with Statement of Relevancy (Five (5) pages).
International Search Report dated Jul. 8, 2012, with Statement of Relevancy (Five (5) pages).
Chinese Office Action issued in counterpart Chinese Application No. 201280009153.1 dated Sep. 2, 2015, with partial English translation (Twelve (12) pages).
German-language Japanese Office Action issued in Japanese counterpart application No. 2014-511754 dated Nov. 26, 2015 (Nine (9) pages).

* cited by examiner

ENERGY STORAGE MODULE COMPRISING A PLURALITY OF PRISMATIC STORAGE CELLS

CROSS REFERENCE TO RELATED APPLICATIONS

This application is a continuation of PCT International Application No. PCT/EP2012/001778, filed Apr. 26, 2012, which claims priority under 35 U.S.C. § 119 from German Patent Application No. DE 10 2011 076 580.8, filed May 27, 2011, the entire disclosures of which are herein expressly incorporated by reference.

BACKGROUND AND SUMMARY OF THE INVENTION

The invention relates to an energy storage module for a device for supplying voltage, in particular, of a motor vehicle, comprising a plurality of prismatic storage cells which, stacked in at least one row, are arranged behind one another and are braced between two end plates by way of tie rods.

In a device for supplying voltage to a motor vehicle usually called a battery, a plurality of energy storage modules is mostly used for the drive of the vehicle, for example, of electric vehicles or hybrid vehicles. A respective energy storage module typically consists of a plurality of stacked prismatic storage cells. The individual storage cells contain electrochemical cells of the battery. The stack of individual storage cells is usually braced by means of a mechanical end plate and tie rods to form the energy storage module. In addition to mechanically fixing the modules with respect to one another, the end plates and tie rods especially have the purpose of counteracting a deformation as a result of gas pressure changes which occur during the operation in the electrochemical cells arranged in the interior of the modules. As a rule, such energy storage modules require a cooling in order to ensure the operating temperature.

It is an object of the present invention to indicate an energy storage module for a device for supplying voltage, which can be produced in a simple manner and from which the cell heat can be effectively removed.

The object is achieved by means of the combinations of characteristics of the independent claim. The dependent claims indicate advantageous embodiments of the invention.

The object is therefore achieved by an energy storage module for a device for supplying voltage, particularly of a motor vehicle, comprising a plurality of prismatic storage cells. The storage cells are stacked in at least one row and arranged behind one another and braced between two end plates (also called pressure plates) by means of at least one tie rod. The at least one tie rod is simultaneously constructed as a heat-conducting plate for removing the heat from the storage cells to a cooling device.

The tie rod or tie rods carry out several functions simultaneously. The tie rods fix the storage cells during the mounting and subsequently brace the end plates. Furthermore, at least one tie rod is simultaneously constructed as a heat-conducting plate. The tie rods can therefore also be called tension elements or fastening elements.

Because of the geometrically narrow dimensions of the cells, the cell heat can no longer be sufficiently removed by way of the cell floor in conventional modules. According to the invention, the tie rod is additionally used as a heat-conducting plate or a heat-conducting plate arranged under the module is simultaneously used as a tie rod. This results in a one-piece further development, according to the invention, of the tie rod and the heat-conducting plate. The heat-conducting plate, which under certain circumstances may already exist for the cooling, is thereby pulled up laterally. Separate lateral tie rods will therefore not be necessary. The tie rods according to the invention, constructed as heat-conducting plates, now have several functions: On the one hand, they are used for cooling the cell module and, on the other hand, for bracing the storage cells. In addition, the laterally pulled-up heat-conducting plate or the tie rod constructed as a heat-conducting plate has the advantage that the storage cell cannot laterally slip during the mounting.

In a particularly preferred development, it is provided that the storage cells have connection terminals which, in the case of all storage cells, are jointly arranged on a front side of the energy storage module. In this case, a first part of the tie rod rests at least partially against the back side of the energy storage module. The back side is defined as the side situated opposite the front side. A second part of the same tie rod rests at least partially against one of the two lateral surfaces of the energy storage module. The "lateral surfaces" extend between the two end plates as well as between the front side and the back side. "Resting" of the tie rods on the energy storage module applies particularly to a resting with a thermally conductive contact. In particular, the tie rods developed as heat-conducting plates are glued to the back side and/or the lateral surfaces and/or a heat-conducting paste is used.

Furthermore, it is advantageously provided that the second part of the tie rod is connected with the laterally two end plates. The bracing and the force transmission therefore take place of the energy storage module. Furthermore, it is an advantage that the first part of the tie rod is spaced away from the end plates. In particular, no connection is provided here between the first part of the tie rod and the end plates. The distance measurements between the end plates and the first parts of the tie rod should be selected corresponding to the required air and creep gaps.

Furthermore, it is preferably provided that the second part of the tie rod extends over the entire height of the energy storage module. The height is defined from the back side to the front side of the energy storage module. As a result, the tie rod utilizes the complete lateral surface of the energy storage module for the heat transmission.

In particular, several tie rods are provided. Two tie rods, with lateral contacts and developed as heat-conducting plates, are particularly preferred.

Still further tie rods, which are not constructed as heat-conducting plates, may be provided between the rows of storage cells.

In the variant with at least two tie rods, it is particularly preferably provided that a first part of a first tie rod and of a second tie rod, each developed as heat-conducting plates, rest at least partially against the back side of the energy storage module, a second part of the first tie rod and of the second tie rod each resting at least partially against one of the two lateral surfaces of the energy storage module.

As an alternative, a first tie rod is arranged on the front side (between the connection terminals) and a second tie rod is arranged on the back side. The two tie rods are then connected on the front side or back side with the end plates. Particularly the lower tie rod (on the back side) replaces the conventional heat-conducting plate. In this alternative, the bracing and the force transmission does not take place laterally of the energy storage module but on the front and back side.

It is further an advantage that a single tie rod consists of a single metal plate. The respective tie rods can therefore be produced in one piece.

In order to ensure a sufficient heat transmission, the following proportions are preferably provided: At least 10%, particularly at least 50%, particularly at least 75% of the surface of the back side of the energy storage module is in heat-conducting contact with the tie rod or the tie rods. Furthermore, at least 10%, particularly at least 50%, particularly at least 75% of the surface of at least one of the two lateral surfaces of the energy storage module is in a heat-conducting contact with the tie rod resting against them.

The end plates (also pressure plates) preferably have a thermally insulated construction with respect to the storage cells.

The providing of at least two tie rods constructed as heat-conducting plates has the advantage that the energy storage module can be mounted in an easy fashion. In this case, the tie rod is preferably glued to the storage cells. Furthermore, an electric insulation layer is arranged between the storage cells and the tie rods. By means of the two-part construction, on the one hand, the insulation layer is not damaged during the joining and, on the other hand, the adhesive remains evenly distributed.

In the following, the invention will be explained in detail by means of the drawing.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, the invention will be explained in greater detail by means of FIGS. 1 to 3.

Figure 1:
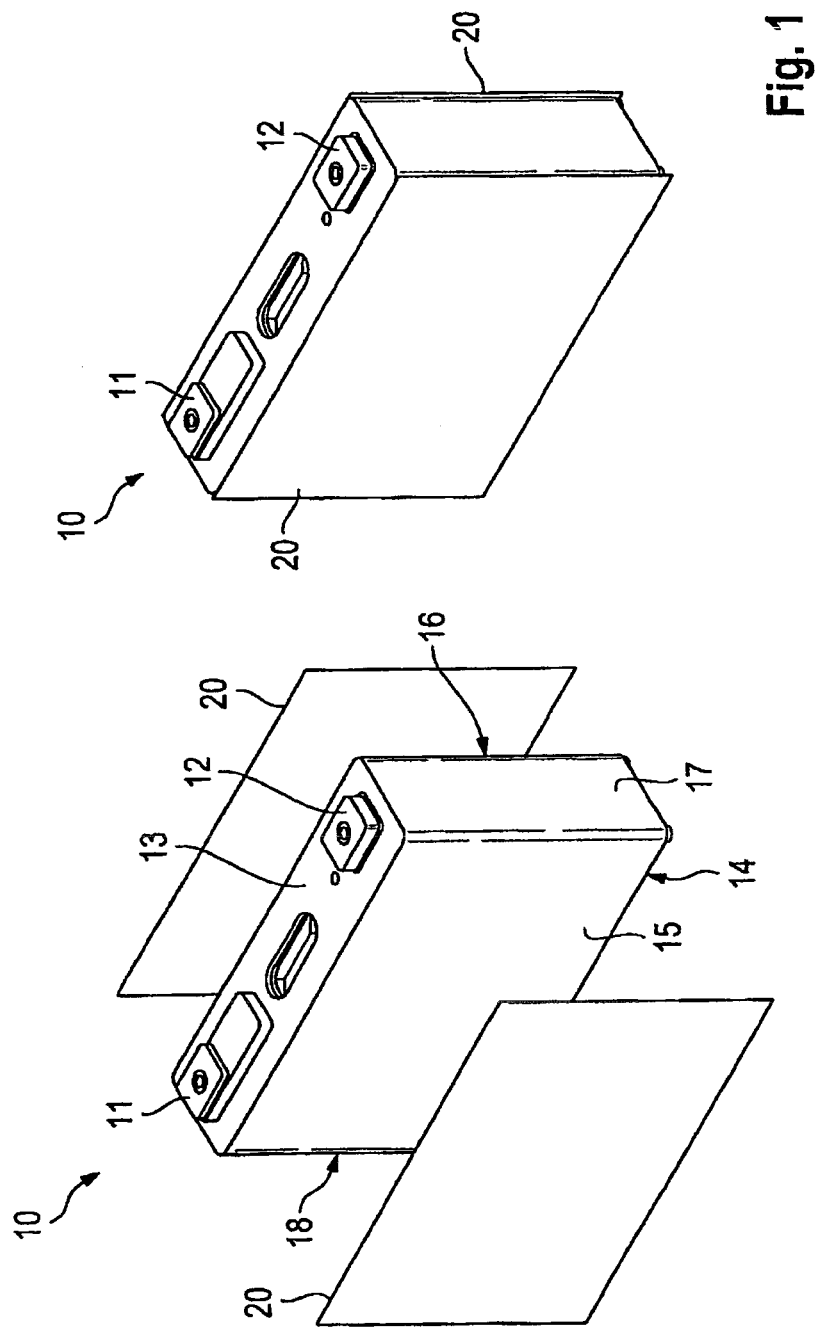
FIG. 1 is a view of storage cells of the energy storage module of the invention according to the embodiment.

FIG. 1 is a perspective view of a single prismatic storage cell 10 of an energy storage module 1 which will be represented in its totality below. The storage cell 10 typically consists of one or more individual electrochemical cells which, in the representation selected here, are hidden in the interior of the storage cell 10. On a front side 13, the storage cell 10 has a connection terminal 11 of the first polarity and a connection terminal 12 of the second polarity. No connection terminals are provided on the back side 14 of the storage cell 10 not shown in the figure. One of the connection terminals 11, 12, typically the positive pole of the storage cell, can be electrically connected with a housing of the storage cell 10.

Since a plurality of the storage cells 10, stacked in at least one row, are arranged behind one another in the energy storage module 1 according to the invention, at least opposite main surfaces 15, 16 are equipped with an electrically insulating material. In the embodiment illustrated in FIG. 1, an adhesive film 20 is applied to the main surfaces 15, 16. As an alternative, an electrically insulating adhesive could also be applied to the main surfaces 15, 16. Likewise, the use of a heat-shrinkable sleeve would be conceivable, which is applied to the main surfaces 15, 16 provided with the adhesive.

Figure 2:
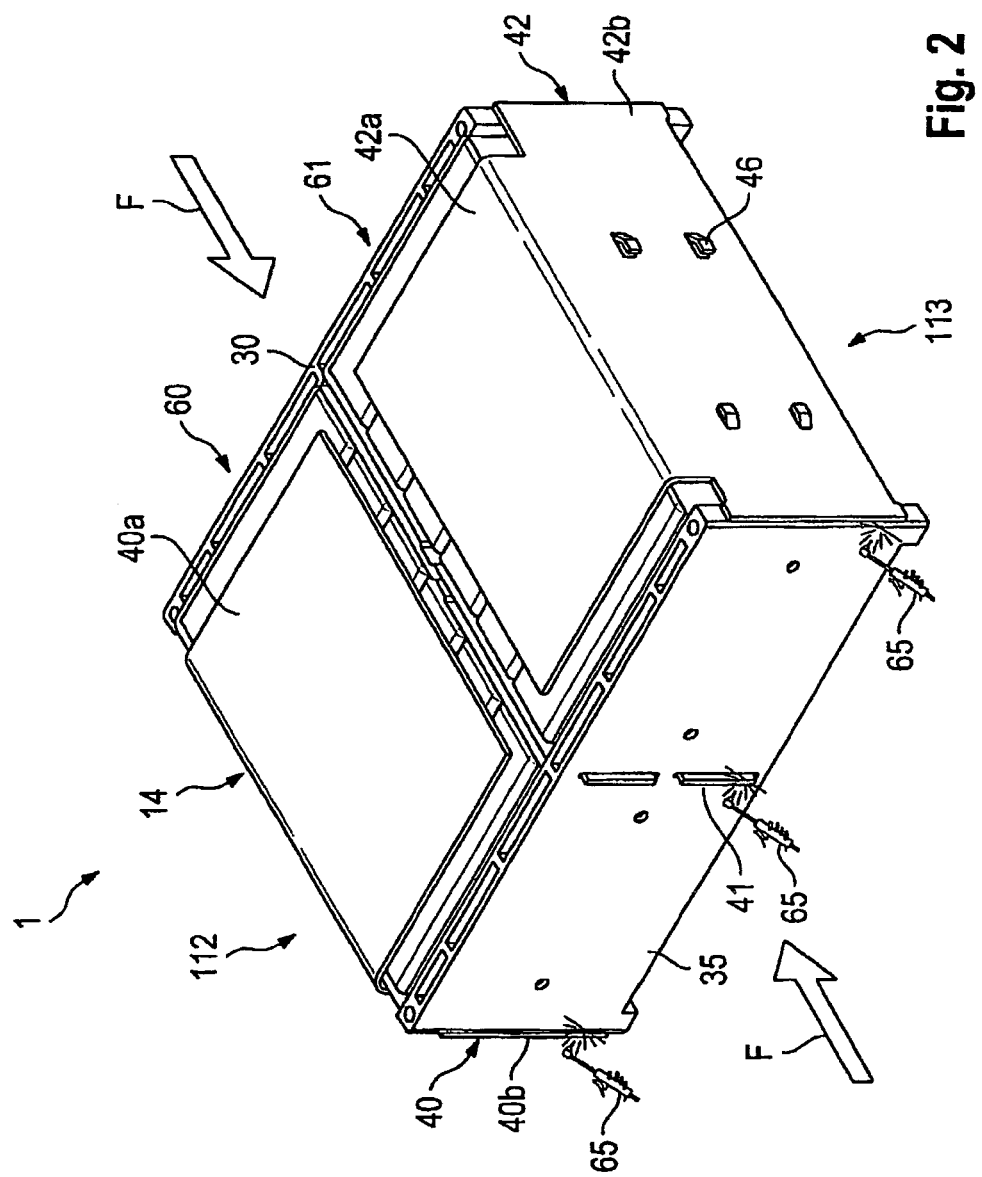
FIG. 2 is a view a bracing of the energy storage module of the invention according to an embodiment.

In the case of the energy storage module according to the invention, only as an example, the storage cells 10 are arranged in two storage cell rows 60, 61, as illustrated, for example, in FIG. 2. As an alternative, FIG. 3 illustrates an example with only one row 60. In the embodiment, the bracing of the storage cells stacked in a row takes place by using end plates 30, 35 and tie rods 40 to 42. FIG. 2 shows an intermediate component of a bracing device, in the case of which an end plate 30, also called a pressure plate, is welded to three tie rods 40, 41, 42. The tie rods 40, 41, 41 are spaced with respect to one another such that, in each case, a receiving region is created for the respective storage cell row 60, 61. Each of the storage cell rows is therefore laterally surrounded by two tie rods 40, 41 and 41, 42 respectively.

Furthermore, four lugs 46 are provided on the tie rod 42, on which lugs 46 a control device can be fastened. In contrast to the tie rods 40, 42, the center tie rod 41 has a thicker construction. For example, the tie rods 40, 42 have a thickness of 2 mm, and the tie rod 41 has a thickness of 3 mm. This ensures a uniform expansion of the energy storage module parallel to the force direction of the bracing (i.e. in the extending direction of the tie rods 40, 41, 42), when the storage cells 10 in the two storage cell rows deform as a result of gas pressure changes during the operation of the storage cells 10.

Welding 65, as the connection between the tie rods 40, 41, 42 and the end plates 30, 35, represents a fast, secure and established connection method in the field of automotive engineering. In principle, the establishment of the mechanical connection of the components illustrated in FIG. 2 could also take place in an alternative manner, for example, by screwing or any other arbitrary form-fitting or frictional connection. While, for the welding 65 with the end plates 30, 35, the two outer tie rods 40, 42 are caused to come in flush contact with their face sides and are welded together, the tie rod 41, which, in the region of its two opposite ends, has one groove respectively for providing respective through-lugs, is fitted into corresponding recesses of the end plates 30, 35 and then welded from the other side.

Figure 3:
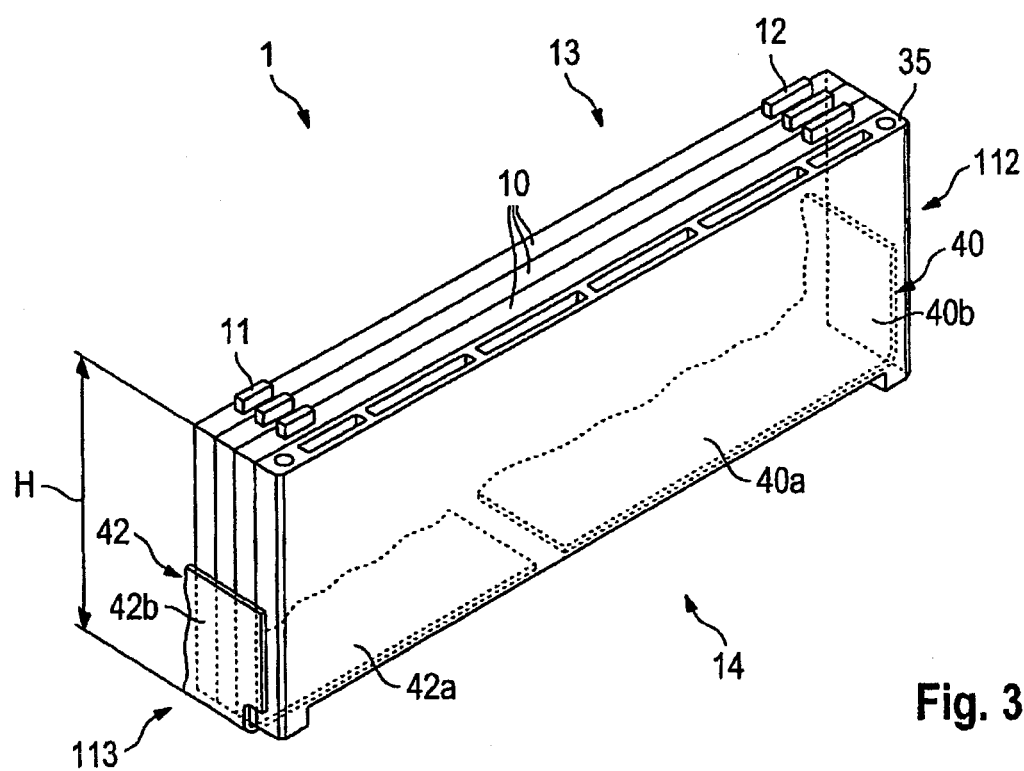
FIG. 3 is a detailed view of the energy storage module of the invention according to an embodiment.

FIG. 3 is a detailed view of the energy storage module 1 according to the invention. Here, only row 60 is provided. The center tie rod 41 is thereby eliminated. Otherwise, the illustration in FIG. 3 corresponds to that of FIG. 2. In FIGS. 2 and 3, it is easily visible that the first tie rod 40 is divided into a first part 40a and a second part 40b. In a symmetrical arrangement, the second tie rod 42 is also divided into a first part 42a and a second part 42b. The respective first parts 40a and 42a rest on the back side 14 against the energy storage module 1. The respective second parts 40b and 42b rest against lateral surfaces 112 and 113 of the energy storage module 1. The two lateral surfaces 112 and 113 are defined as the surfaces between the two endplates 30, 35, the front side 13 and the back side 14. In particular, the two lateral surfaces 112 and 113 are perpendicular with respect to the front and back side 13, 14.

The two tie rods 40, 42 according to the invention permit a dissipation of the heat from the storage cells 10. In particular, it is provided that the tie rods 40, 42 constructed as heat-conducting plates are in a heat-conducting contact with a cooling device.

Because of the work tolerances of the individual storage cells 10, it is possible that the back side 14 on the individual storage cells 10 is not situated in a plane. For this purpose, a heat-conducting adhesive is applied particularly to the first parts 40a, 42a of the tie rods 40, 42. By means of the heat-conducting adhesive, a compensation is implemented between different heights of the back side 14. In order to ensure that all storage cells 10 are connected by way of the heat-conducting adhesive with the heat-conducting plate and the cooling device, as a function of a determined height tolerance, a quantity control of the heat-conducting adhesive can take place that meets the requirements. In practice, it is sufficient for a distance of between 0.2 and 0.6 mm between the tie rods 40, 42 and the back side 14 to be able to be compensated by the heat-conducting adhesive.

Two further developments are described above. In a first further development, a tie rod is constructed as a heat-conducting plate for removing the heat from the storage cells to a cooling device. The tie rod according to the invention therefore has two functions: On the one hand, it is used, according to its original function, for bracing the storage cells, and, on the other hand, it is additionally used for cooling the energy storage module or the storage cells. In a second further development, a heat-conducting plate arranged below the energy storage module is constructed for bracing the storage cells. For this purpose, the heat-conducting plate, which is present anyhow, is laterally pulled up, whereby separate lateral tie rods become unnecessary. The heat-conducting plate according to the invention therefore has two functions: On the one hand, it is used, according to its original function, for the cooling of the energy storage module or of the storage cells and, on the other hand, it is additionally used for bracing the storage cells. In the second further development, the heat-conducting plate is advantageously constructed in two parts, whereby the energy storage module can be assembled in a simple manner. As a result, an insulation layer, which may possibly be arranged between the storage cells and the heat-conducting plate, will not be damaged during the assembly and an adhesive used for the gluing of the storage cells to the heat-conducting plate will remain evenly distributed. The two further developments have in common that the heat-conducting plate and the at least one tie rod are constructed in one piece. In other words, the energy storage module has a component which takes over the function of a tie rod as well as the function of a heat-conducting plate. The two further developments should therefore be considered to be absolutely equal. The shifting of the application for protection, which is filed with this patent application, away from one of the two further developments to another further development is therefore definitely considered.

LIST OF REFERENCE NUMBERS AND SYMBOLS

1 Energy storage module
10 Storage cell
11 Connection terminal of the first polarity
12 Connection terminal of the second polarity
13 Front side
14 Back side
15 Main surface
16 Main surface
17 Face side
18 Face side
20 Adhesive film
30 End plate
35 End plate
40 Tie rod
40a First part
40b Second part
41 Tie rod
42 Tie rod
42a First part
42b Second part
46 Lug
60 Storage cell row
61 Storage cell row
65 Welding
112 First lateral surfaces
113 Second lateral surfaces
H Height The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage module for a device for supplying voltage of a motor vehicle, the energy storage module comprising a plurality of prismatic storage cells, which, stacked in at least one row, are arranged behind one another and braced between two end plates by at least two tie rods, wherein each of the at least two tie rods is constructed as a one-piece heat-conducting plate for removing the heat from the plurality of prismatic storage cells to a cooling device,
   wherein the energy storage module has a front side, a back side situated opposite the front side, and two lateral surfaces extending between the two end plates and between the front side and the back side,
   wherein the plurality of prismatic storage cells have connection terminals which, in the case of all storage cells, are jointly arranged on a front side of the energy storage module,
   wherein at the back side of the energy storage module, no connection terminals are arranged,
   wherein a first part of each of the at least two tie rods resting at least partially against the back side of the energy storage module, and a second part of each of said at least two tie rods resting partially against a corresponding one of the two lateral surfaces of the energy storage module, and
   wherein the second part of each of the at least two tie rods extends, from the back side to the front side, over an entire height of the energy storage module wherein the first part of each of the at least two tie rods is spaced away from the end plates.

2. The energy storage module according to claim 1, wherein the second part of each of the at least two tie rods is connected with the two end plates.

3. The energy storage module according to claim 2, wherein the second part of each of the at least two tie rods extends, from the back side to the front side, over an entire height of the energy storage module.

4. The energy storage module according to claim 1, wherein the second part of each of the at least two tie rods extends, from the back side to the front side, over an entire height of the energy storage module.

5. The energy storage module according to claim 1, wherein each of the at least two tie rods consists of a single plate.

6. The energy storage module according to claim 1, wherein at least 10% of the surface of the back side of the energy storage module is in a heat-conducting contact with the at least two tie rods.

7. The energy storage module according to claim 1, wherein at least 50% of the surface of the back side of the energy storage module is in a heat-conducting contact with the at least two tie rods.

8. The energy storage module according to claim 1, wherein at least 75% of the surface of the back side of the energy storage module is in a heat-conducting contact with the at least two tie rods.

9. The energy storage module according to claim 1, wherein at least 10% of the surface of the two lateral surfaces of the energy storage module is in a heat-conducting contact with a corresponding one of the at least two tie rods.

10. The energy storage module according to claim 1, wherein at least 50% of the surface of at least one of the two lateral surfaces of the energy storage module is in a heat-conducting contact with a corresponding one of the at least two tie rods.

11. The energy storage module according to claim 1, wherein at least 75% of the surface of at least one of the two lateral surfaces of the energy storage module is in a heat-conducting contact with a corresponding one of the at least two tie rods.

12. The energy storage module according to claim 1, wherein the first parts of the at least two tie rods, resting at least partially against the back side of the energy storage module, are spaced apart from each other.

13. The energy storage module according to claim 1, wherein the first parts of the at least two tie rods extend only partially across the back side of the energy storage module.

* * * * *